UNITED STATES PATENT OFFICE.

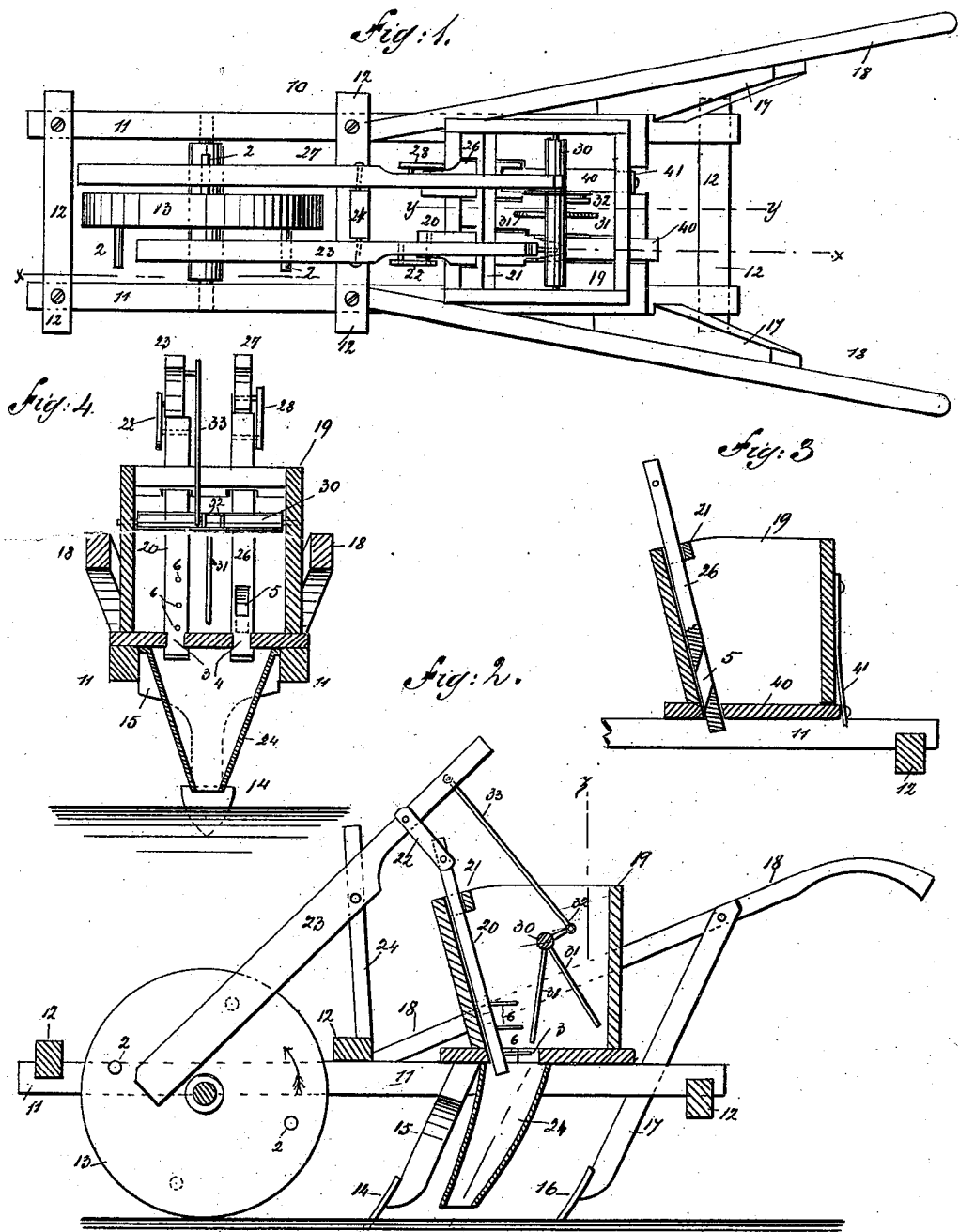

JAMES P. HASTY AND GEORGE L. HISE, OF HONEY GROVE, TEXAS.

PLANTER.

SPECIFICATION forming part of Letters Patent No. 355,525, dated January 4, 1887.

Application filed October 14, 1886. Serial No. 216,238. (No model.)

*To all whom it may concern:*

Be it known that we, JAMES P. HASTY and GEORGE L. HISE, both of Honey Grove, in the county of Fannin and State of Texas, have invented a new and Improved Planter, of which the following is a full, clear, and exact description.

Our invention relates to the construction of a cheap, durable, and efficient combined corn and cotton planter and fertilizer-distributer, as will be hereinafter described, and specifically pointed out in the claims.

Reference is to be had to the accompanying drawings, forming a part of this specification, in which similar figures of reference indicate corresponding parts in all the views.

Figure 1 is a plan view of our improved form of planter. Fig. 2 is a longitudinal sectional view of the planter, taken on the line $x\ x$ of Fig. 1. Fig. 3 is a sectional view of the seed-distributing slide, the view being taken on the line $y\ y$ of Fig. 1, and Fig. 4 is a cross-sectional view taken on the line $z\ z$ of Fig. 2.

In the drawings, 10 represents the supporting-frame of our improved form of planter, which frame consists of two parallel longitudinal sills, 11, and three cross-bars, 12, the sills and cross-bars being arranged as best shown in Fig. 1. Between the sills 11 there is mounted a ground-wheel, 13, which carries four pins, 2, two of said pins being arranged upon either side of the wheel.

Back of the wheel 13 there is mounted a furrow-opening shovel, 14, that is carried by a standard, 15, said standard being rigidly connected to the sills 11, to the rear of the central cross-bar, 12, furrow-closing shovels 16 being mounted on standards 17, as best shown in Figs. 1 and 2, the said standards 17 projecting upward and serving as the rear supports for the handles 18, the forward ends of the handles being secured to the sills 11 just to the rear of the central cross-bar, 12, as clearly shown.

Between the handles 18 there is mounted a seed box or hopper, 19, in the bottom of which there are two openings, 3 and 4, the opening 3 being entered by a cotton-seed distributer, 20, which distributer consists of a strip provided with pins 6, the strip being mounted to slide against the forward inner face of the hopper, but being guided by a cross-bar, 21, in which there is formed an opening, through which the distributer 20 passes.

The upper end of the distributer 20 is connected by a link, 22, with a lever, 23, said lever being pivotally connected to a standard, 24, that projects upward from the central cross-bar, 12. The lever 23 extends forward beyond the axle of the wheel 13 and in line with the pins 2 upon one side of said wheel, so that as the machine advances the forward end of the lever will be raised by each pin as it passes forward in the direction of the arrow shown in Fig. 2; but when the pin passes from beneath the lever the lever will drop back to the position in which it is shown, this motion of the lever imparting a reciprocating motion to the slide, and the cotton-seed will thereby be separated and delivered to the furrow formed by the shovel 14 through a chute, 24.

Near the opposite side of the hopper there is a grain-distributing slide, 26, which is also guided within an aperture formed in the cross-bar 21, this slide being formed with a diagonal slot or opening, 5. The upper end of the slide 26 is connected to a second lever, 27, by a link, 28, the lever 27 extending forward, so as to be operated upon by the pins 2 of the wheel 13.

Across the hopper there is arranged a shaft, 30, mounted so as to be free to swing upon its connection with the hopper, said shaft being provided with agitator-fingers 31 and with crank-arms 32, to either of which crank-arms 32 there may be connected a link, 33, to extend upward to one of the levers 23 and 27. This agitator is more specially adapted to keep the cotton-seed from bunching in the hopper, and for throwing the fertilizer forward toward the chute 24 at times when the planter is being used as a fertilizer-distributer.

In the bottom of the hopper there are two shutters, 40, the shutter arranged in connection with the slide 26 being normally held forward by a spring, 41, which may be thrown back should it at any time be desired to distribute a large amount of fertilizer through the bottom of the hopper.

Having thus fully described our invention, we claim as new and desire to secure by Letters Patent—

1. A planter consisting of a frame, furrow opening and covering plows secured to the same, a wheel journaled in the said frame and provided with laterally-projecting pins on its sides, a hopper mounted on the frame and provided with apertures in its bottom, two seed-slides working in said apertures, one of the slides being provided with pins and the other with slots, a stirrer journaled in the hopper, and levers fulcrumed on the frame, and having their forward ends engaging the pins of the wheel and their rear ends connected with the said seed-slides and stirrer, substantially as herein shown and described.

2. In a planter, the combination, with a frame, a hopper mounted thereon, and a wheel provided with pins projecting from its sides, of the slide 20, provided with the pins 6, the slide 26, provided with the diagonal slots 5, the levers 23 and 27, pivoted to the said frame, and the links 22 and 28, substantially as herein shown and described.

3. In a planter, the combination, with a frame, a hopper, and a wheel provided with pins projecting from its sides, of the slide 20, provided with the pins 6, the slide 26, provided with the inclined slots 5, the levers 23 27, pivoted to the frame, the links 22 28, connected to the said slides and levers, the stirrer-shaft 30, provided with the crank-arms 32, and the link 33, substantially as herein shown and described.

JAMES P. $\overset{\text{his}}{+}$ HASTY.
$\overset{\text{mark.}}{}$
GEORGE L. HISE.

Witnesses:
  WM. H. GROSS,
  T. A. BARRON.